United States Patent [19]

Gibbons

[11] 4,431,917
[45] Feb. 14, 1984

[54] COMPACT, HIGH COLD SHIELD EFFICIENCY OPTICAL SYSTEM

[75] Inventor: Robert C. Gibbons, Richardson, Tex.

[73] Assignee: Texas Instruments Incorporated, Dallas, Tex.

[21] Appl. No.: 325,459

[22] Filed: Nov. 27, 1981

[51] Int. Cl.³ .......................... H01J 31/49; G01J 1/00
[52] U.S. Cl. ..................................... 250/332; 250/352
[58] Field of Search .............. 250/330, 332, 334, 338, 250/352, 353; 350/1.1, 1.2, 1.3, 1.4

[56] References Cited

U.S. PATENT DOCUMENTS

| | | | |
|---|---|---|---|
| 3,252,373 | 5/1966 | Shenker | 350/1.2 |
| 3,296,443 | 1/1967 | Argyle | 350/1.3 |
| 3,858,046 | 12/1974 | Cubalchini | 250/353 |
| 3,963,926 | 6/1976 | Borrello | 250/332 |
| 4,327,291 | 4/1982 | Chapman et al. | 250/332 |

*Primary Examiner*—Janice A. Howell
*Attorney, Agent, or Firm*—Rene E. Grossman; Melvin Sharp; N. Rhys Merrett

[57] ABSTRACT

An optical system is disclosed for use with a radiant energy receiver which provides high cold shield efficiency and is compact; further the optical system is temperature tolerant to maintain focus with changes in temperature and wavelength without operator intervention. The optical system has primary utility in the infrared region of the spectrum and where a two dimensional array of detectors senses the infrared radiant energy or flux from the scene of interest. The optical system is comprised of a window for environmental protection and two objective mirrors for folding and focusing the scene of interest on a first focal plane. Relay optical means, which may be comprised of one or more optical elements, relays and relocates the first focal plane to a second focal plane which is coincident with the surface of the two dimensional detector array; the relay optical means also forms an exit pupil (the image of the aperture stop) around which the aperture of a cold shield is positioned to minimize extraneous radiant energy falling on the detector array. Using a positive and negative refractive lens and judicious selection of materials allows the relay optical means to automatically compensate for variation in its index of refraction as a function of temperature and wavelength.

6 Claims, 6 Drawing Figures

COMPACT, HIGH COLD SHIELD EFFICIENCY OPTICAL SYSTEM

This invention relates to optical systems and more particularly relates to an infrared optical system having a high cold shield efficiency with thermal stability.

Cold shield efficiency, defined as the ratio of the solid angle subtended by the exit pupil to the solid angle subtended by the cold shield has always been an important parameter in infrared detectors utilizing background limited photodetectors. Most forward looking infrared detector (FLIR) systems utilize a linear array of detectors. Prior art methods of protecting such a linear array of detectors from extraneous radiant energy is through the use of silicon material with slots therein positioned over the linear array of detectors such that the slots overlay the detector elements. An example of such a prior art silicon slot cold shield is described in U.S. Pat. No. 3,963,926 entitled "Detector Cold Shield" and assigned to the same assignee as the present invention.

However, silicon slot cold shields are somewhat impractical for a two dimensional array of detectors because of the proximity of detectors. The importance of high cold shield efficiency is even more critical for a two dimensional array of detectors such as, charge transfer device detectors arrays, which may comprise, by way of example, a matrix of 128×128 detector elements. These types of detectors utilize integrating wells which store electrical charge proportional to the amount of radiant energy impinging thereon. The limited charge storage capacity of the integrating wells within which the signal is stored makes it essential to hold the extraneous flux collected by the detector array to the absolute minimum. Thus the detector array should see only that radiant energy (or photon flux) originating at the scene of interest, that is, that flux entering through the optics of the system. Insofar as is possible, extraneous sources of radiation such as from the FLIR housing should not contribute to the flux which the detector matrix must store. An example of such a two dimensional charge-integrating detector array is disclosed in U.S. Pat. No. 4,327,291, filed June 16, 1980 and entitled "Infrared Imaging System" and assigned to the same assignee as the present invention.

Accordingly, it is an object of the present invention to provide an optical system having high cold shield efficiency.

Another object of the present invention is to provide an optical system which limits the flux impinging on the detector to only that emanating from the scene of interest.

Another object of the present invention is to provide an optical system having high cold shield efficiency to limit the spatial extent of the incoming flux to only that flux entering through the entrance pupil of the optics.

Another object of the present invention is to provide an optical system having a compact layout for small space-constrained applications.

Still another object of the present invention is to provide a temperature tolerant infrared optical system which maintains focus over varying temperature conditions without human intervention.

Still another object of the present invention is to provide an infrared optical system having relay optics which provide wide band spectral coverage.

Other objects and features of the invention will become more readily understood from the following detailed description and appended claims when read in conjuction with the accompanying drawings, in which like reference numerals designate like parts throughout the figures thereof, and in which:

Figure 1:
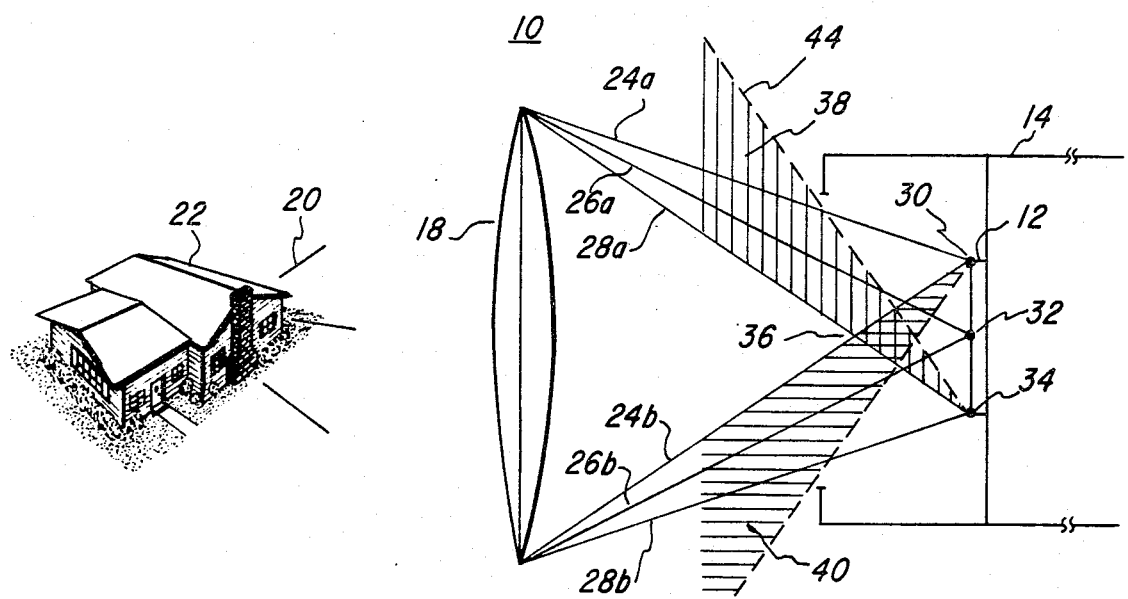
FIG. 1 illustrates a portion of a prior art radiant energy receiver and optical system.

Referring now to to FIG. 1, there is illustrated a prior art optical system 10 for protecting a detector array 12 from extraneous radiation. Detector array 12 may be any photon or thermal detector array. Detector array 12 is attached to a glass stem 14. Also attached to glass stem 14 is cold shield 16 which may be made of steel, by way of example. Converging lens 18 converges the radiant energy 20 from a scene of interest 22 and focuses such radiant energy 20 onto the face of detector array 12. The radiant energy flux 24a and 24b define a solid angle which is focused at point 30 on the face of detector array 12. In similar manner, radiant flux 26a and 26b is focused or imaged at point 32 on the face of detector array 32 while radiant energy flux 28a and 28b are focused at point 34 on the face of detector array 12. The aperture 36 in cold shield 16 must be large enough to accommodate flux 24a and 28b. The problem which occurs with this type of optical system and cold shield arrangement is that, by way of example, a detector at location 30 in array 12 can receive ambient temperature flux over an angle defined by the two extreme rays 24a and 42. This angle is considerably larger than the angle defined by the rays 24a and 24b which define the incoming radiation focused by lens 18 on detector 30 from scene 22. This greatly increased radiation flux illustrated as horizontal lines 40 contains no more signal and thus does not contribute usefully to the system signal-to-noise ratio, but in fact causes extra noise and charge storage capacity problems. In a similar manner, detectors located at other positions in the detector array 12, such as 32 and 34, also receive radiation flux in excess of that arriving from the scene 22. The excess flux for detector 34 is illustrated by vertical lines 38 while the excess flux for detector 32 is not shown for purposes of clarity. The prior art cold shielding scheme shown in FIG. 1 produces low cold shielding efficiencies, the exact magnitude depending on the size of the array 12. For typical array sizes, cold shield efficiencies in the order of 30% are achieved. For two dimensional detector arrays (particularly those that are charge integrating detector arrays which have limited charge storage capacity), it is essential to hold the extraneous radiation flux collected by the detector array to an absolute minimum.

Figure 2:
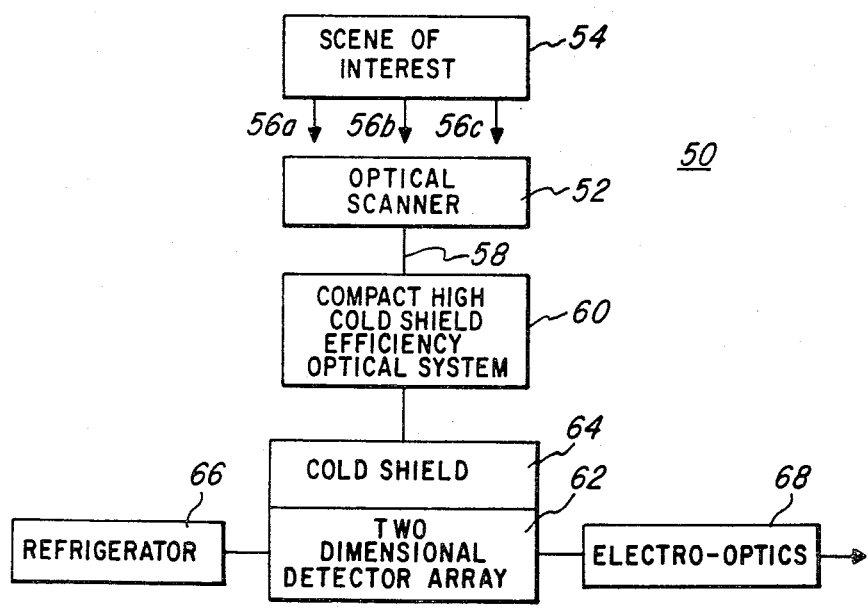
FIG. 2 is a block diagram of the radiant energy receiver constituting the subject matter of this invention.

Referring to FIG. 2, an improved radiant energy receiver 50 is illustrated in block diagram form to illustrate the operational relationship of the major components. Receiver 50 comprises an optical scanner 52 (which is optional) for scanning the scene of interest 54 which emits radiant energy or flux 56; radiant energy 56 is transmitted through a compact, high cold shield optical system 60 constructed according to the present invention which, after passing through multiple optical elements, focuses the radiant energy on a detector array 62. Connected to the detector array 62 is a cold shield 64 and a refrigerator 66 and electro-optics 68. The scene of interest 54 transmits radiant energy 56 and provides a field of view or path of incoming radiant energy or flux through collecting and focusing optical system 60 through a cold shield 64 and is imaged on a detector array, which in the preferred embodiment is a two dimensional array 62. Extraneous radiation is prevented from impinging on detector array 62 by cold shield 64. The refrigerator or Dewar 66 keeps detector array 62 at a predetermined temperature. Detector array 62 produces electrical signals representative of the radiant energy impinging upon it which are amplified and processed in electro-optics system 68. Electro-optics system 68 may produce a video signal for further processing or produce a visual display. As those skilled in the art are familiar with the elements of a radiant energy receiver 50, no detailed description thereof is given. Those desiring a more detailed description are referred to U.S. Pat. No. 3,742,238 entitled "Two Axes Angularly Indexing Scanning Display" issued June 26, 1973 and assigned to the same assignee as the present invention.

Figure 3:
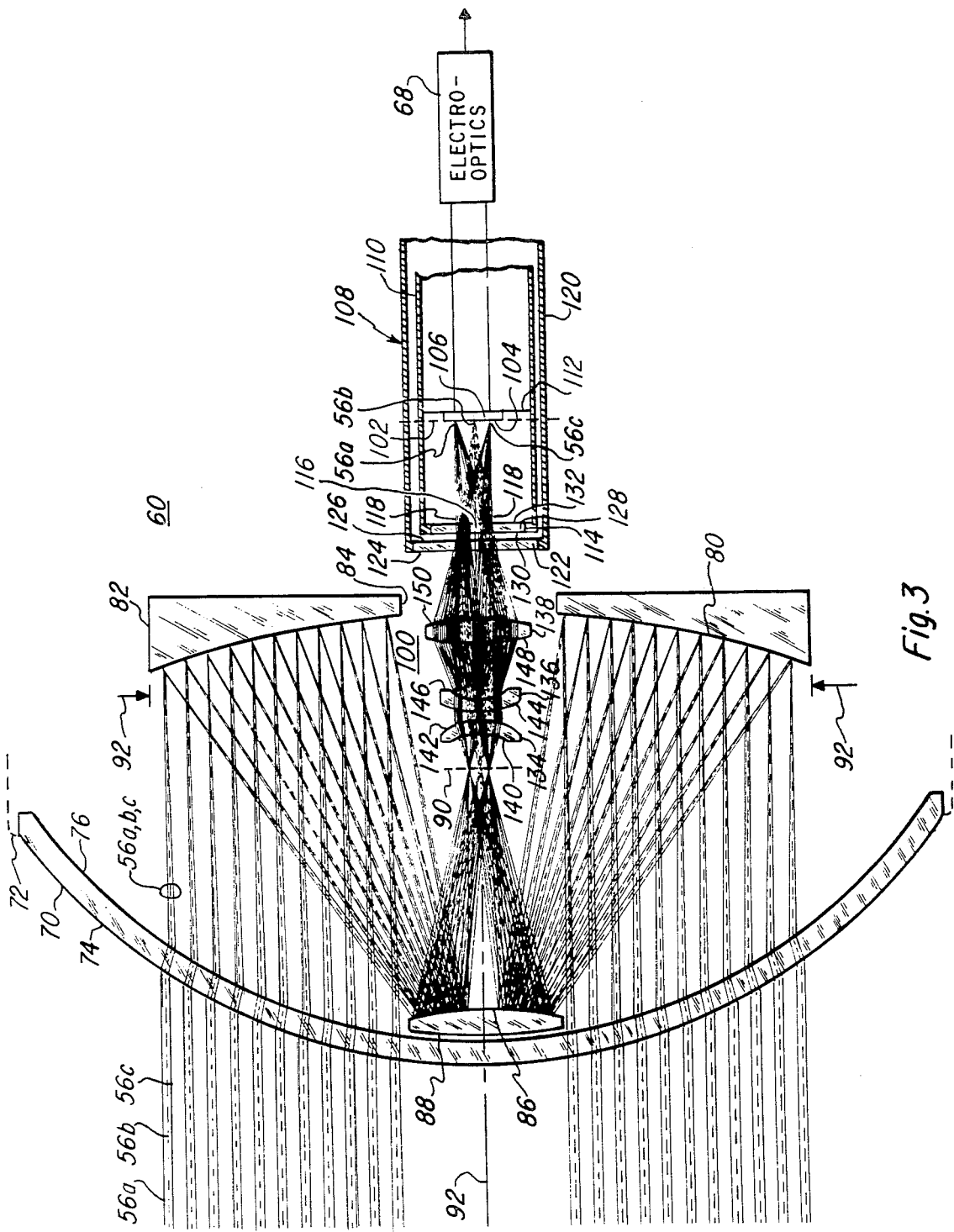
FIG. 3 is a side view of the optical system according to the present invention.
Figure 4:
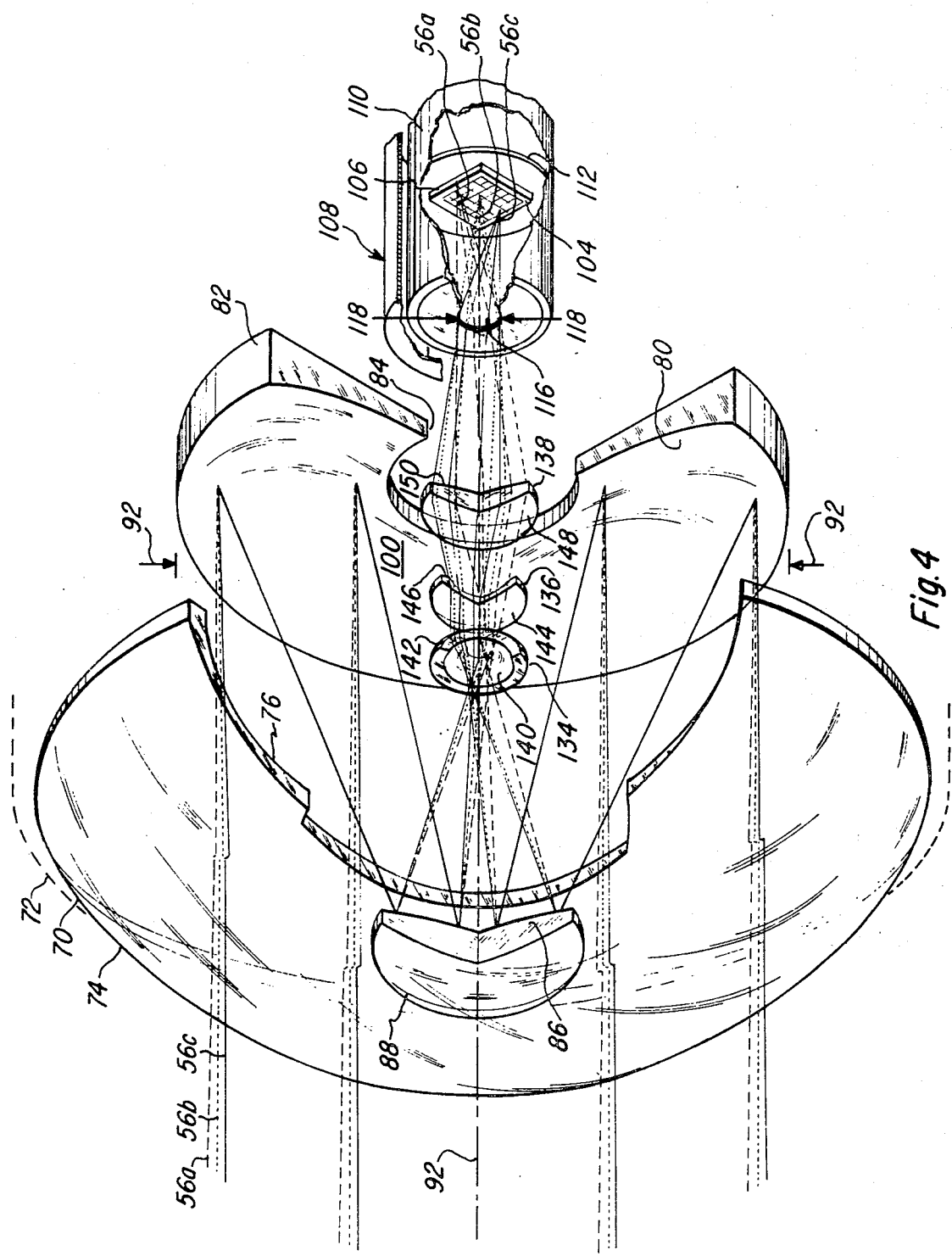
FIG. 4 is a perspective view of the optical system of FIG. 3.
Figure 5:
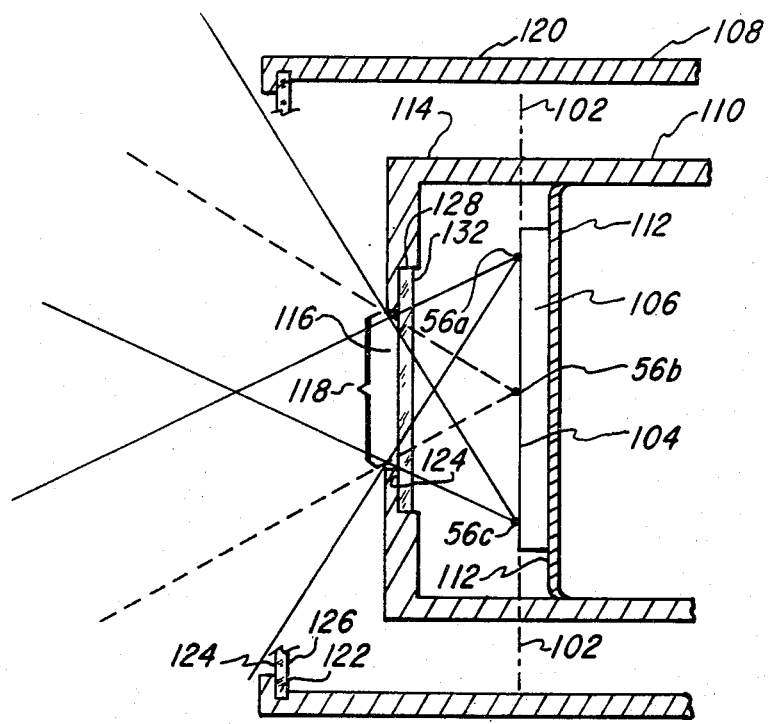
FIG. 5 is an enlarged view of the Dewar, cold shield and exit pupil (also shown in FIG. 3).

FIG. 3 illustrates a side view of the high cold shield efficiency optical system 60 constructed according to the present invention as well as selected components of the radiant energy receiver 50 while FIG. 4 illustrates a perspective view of the optical elements. FIG. 5 illustrates an enlarged view of the Dewar 108, cold shield 114 and exit pupil 118. Optical system 60 has utility in radiant energy receivers 50 (FIG. 2) where space is very limited such as in hand-held thermal viewers, remote piloted vehicles, and missile seekers; these types of applications do not normally require an optical scanner 52. Presently optical scanners are used in airborne and shipboard applications but as larger two dimensional focal plane arrays become technically feasible, optical scanners will not be required in these types of applications and the type of high cold shield efficiency optical system described herein will be even more important. In the preferred embodiment, the incoming radiation 56 from the scene of interest (FIG. 2) will be in the infrared region of the spectrum, normally between 3 and 14 microns. The incoming infrared energy or flux 56a–56c passes through a window 70 which is attached to housing 72; window 70 environmentally protects the internal optics and other equipment from the elements. Window 70, in the preferred embodiment, is a refractive optical element which is made of zinc sulfide and has a spherical shape. Radiant energy flux 56a–c is refracted through the surfaces 74 and 76 of window 70 and strikes surface 80 of primary mirror 82. Primary mirror 82 has an aperture or hole 84 therethrough. Primary mirror 82 may be made of aluminum or other suitable material. In the preferred embodiment, surface 80 of primary mirror 82 is a conic and more particularly is of an elliptical shape.

Flux 56a–c is folded and then reflected off of surface 86 of secondary mirror 88. Secondary mirror 88 is also made of aluminum or other suitable material; surface 86 is aspheric. In the preferred embodiment, secondary mirror 88 obscures no more than 25% to 40% of the diameter of the incoming radiant energy. Refractive element 70, primary mirror 82 and secondary mirror 88 form a catadioptric objective optical system which folds and focuses the incoming radiant energy 56a–56c from the scene of interest 54 (FIG. 2) to form a first focal plane 90 which is symmetrical around the optical axis 92 of the optical system 60. Primary mirror 82 defines the aperture stop 92 of the optical system 60. The image of the aperture stop 92 viewed from the scene of interest 54 is defined as the entrance pupil; the image of the aperture stop 92 viewed from detector array 106 is defined as the exit pupil 118.

A relay optical system 100 is optically positioned along the optical axis 92 to form a second focal plane 102 on the surface 104 of detector matrix 106. In the preferred embodiment, detector matrix 106 is a two dimensional array, such as a charge transfer device type detector array. Relay optics 100 serves the purpose of relaying or transferring the first focal plane 90 to a second position (namely the second focal plane 102) in order that the image of the scene of interest 54 may be imaged on the surface 104 of detector 106 which, in an infrared environment, must be refrigerated to a temperature below ambient, 5 K. to 250 K. being typical, 77 K. most common; relay optics 100 also serves the purpose of forming an exit pupil (which will be described hereinafter). It is necessary that the detector array 106 be positioned in a Dewar 108 which is capable of achieving these temperatures. Flux 56a, 56b and 56c are refocused on the second focal plane 102 which is coincident with the surface 104 of detector 106 as shown in FIG. 3 and in more detail in FIG. 5. Detector 106 is affixed to a glass stem 110 and the end portion 112 of glass stem 110 is kept at 77 K. Also attached to glass stem 110 is a circular cold shield 114 (which can be made of steel, for example) which has an aperture 116 therein. The cold shield 114 is positioned along optical axis 92 such that aperture 116 is located at the exit pupil 118; aperture 116 in cold shield 114 has substantially the same geometric configuration as the flux formed at exit pupil 118 to thereby reduce any extraneous radiant energy (from the housing or other sources) from entering therein. The exit pupil 118 is the refocused image of the aperture stop 92; therefore by placing the aperture 116 in cold shield 114 at this location, the extraneous radiant energy from unwanted sources is thereby minimized.

Glass stem 110 is enclosed in a vacuum environment by an aluminum or steel vacuum housing 120 having a window 122 affixed thereto. Window 122, comprised of front surface 124 and back surface 126, may be made of germanium or sapphire, by way of example. Window 122 and housing 120 are not shown in FIG. 4 for purposes of clarity. Connected to the rear of cold shield 114 is a spectral filter 128, composed of front surface 130 and back surface 132, which may be made of germanium or other suitable material.

As mentioned previously, relay optical means 100 is optically positioned after the first focal plane 90 and refocuses said first focal plane 90 to a second position, namely along second focal plane 102, which is coincident with the front surface 104 of detector 106; furthermore, relay optical means 100 forms an exit pupil 118 which is the image of aperture stop 92. To provide and maintain a compact optical system, it is desirable to include relay optical means 100 between primary mirror 82 and secondary mirror 88. The overall length of optical system 60 must often be kept short in order to fit in the allowable space. The ratio of overall length to effective focal length for optical system 60 is 0.3. In the embodiment illustrated in FIGS. 3 and 4, relay optical means 100 is comprised of lens 134, lens 136 and lens 138. Lens 134, having a front surface 140 and a back surface 142, is a concave-convex positive lens. Lens 136, having a front surface 144 and a back surface 146, is a convex-concave negative lens. Lens 138, having a front surface 148 and a back surface 150, is a convex-convex positive lens. Lenses 134, 136 and 138 are refractive and all surfaces thereon are spherical. By way of example, lens 136 may be made of zinc sulphide while lenses 134 and 138 may be made of a chalcogenide glass, such as TI 1173 glass manufactured and sold by Texas Instruments Incorporated, Dallas, Tex. Cold shield efficiencies in the order of 90% are attainable with a radiant energy receiver employing optical system 60.

It is often important for the optical system 60 to be temperature tolerant, that is, to maintain focus with changes in temperature without operator intervention. This is a particular problem for optics operating in the infrared region (for example, the 3 to 14 micron range) due to the high index of refraction change in many common infrared optical materials as a function of temperature. Variations in both temperature and wavelength change the index of refraction which causes a defocus in the infrared optical system 60. Relay optical means 100 is capable of automatically compensating for variations in index of refraction both as a function of temperature and wavelength by balancing the thermal and chromatic aberrations of negative lens 136 and positive lens 138.

The theory of this correction is quite simple, although the limited choice of optical materials sometimes make the application of this theory quite difficult. The theory for thermo-optical correction is developed in an analagous manner to the classic case of chromatic correction. Differentiation of the thin lens equation with respect to temperature yields the equation $$\frac{df}{dT} = -f\left(\frac{1}{n-1} \cdot \frac{dn}{dT} - \alpha\right)$$

where f is the effective focal length of the lens, n is its index of refraction, and $\alpha$ is the thermal expansion coefficient of the lens material. This equation is identical to the case for thin lens chromatic aberration if the chromatic Abbe number, $v_T$, is replaced by a similar thermal v-number.

$$v_T = \left(\frac{1}{n-1} \cdot \frac{dn}{dT} - \alpha\right)^{-1}$$

This analogy with the thin lens chromatic aberration can be extended further to include the case of achromatization of a thin lens closely spaced doublet. Replacing the chromatic Abbe v-number with the thermal v-number, we can solve for the powers of the elements required to make the effective focal length insensitive to temperature changes:

$$\phi_a = \frac{v_{Ta}}{f(v_{Ta} - v_{Tb})}$$

$$\phi_b = \frac{v_{Tb}}{f(v_{Tb} - v_{Ta})}$$

where $v_{Ta}$ and $v_{Tb}$ are the thermal v-numbers of the first and second lens respectively.

Comparison with the corresponding equations for the case of chromatic correction shows that both thermal and chromatic correction can be simultaneously achieved if the materials used for both lenses have the same ratio of v to $v_T$. For several examples from the infrared region of the spectrum, the ratio of $v/v_T$ for ZnSe is $1.63 \times 10^{-3}$; the same ratio for ZnS is $1.27 \times 10^{-3}$, which is a reasonably close match. If the overall focal length desired is substituted into the left pair of equations above for the element powers, the resulting thin-lens doublet will be athermalized and, by virtue of the material choices, automatically achromatized to a very good degree.

Figure 6:
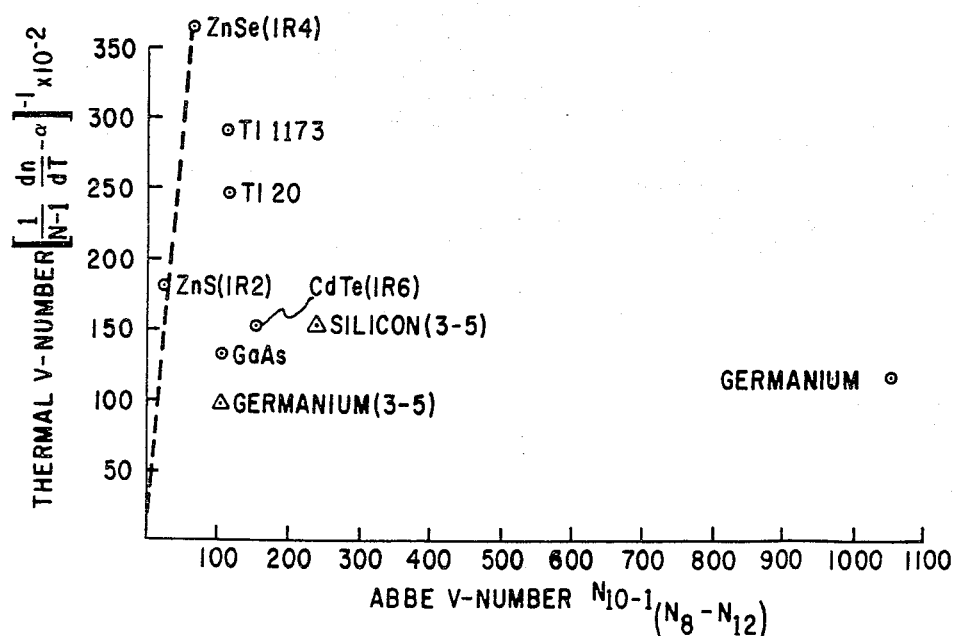
FIG. 6 is a graph of thermal v-number versus Abbe v-number for selected infrared materials.

FIG. 6 illustrates graphically a method of viewing this material selection technique. The Abbe v-number between 8 and 12 $\mu$m for various materials is plotted horizontally, and the corresponding thermal v-number is plotted vertically. A straight line passing through the origin and any two candidate materials, of course, indicates an identical ratio of $v/v_T$ for those two materials. The dashed line shown in FIG. 6 is for the two materials discussed in the example above, ZnSe and ZnS. These two elements would be a logical choice for a closely spaced doublet. Notice also the position of germanium on the extreme lower right corner. No candidate materials exist with which to form an athermal pair with germanium. These same principles are applied to achieve an optical system 60 corrected for both chromatic and thermal aberrations.

To design a relay optical system which automatically corrects (without operator intervention) for both temperature and wavelength, it is desirable to have at least two lenses (such as lens 136 and 138). Additional lenses may be required such as lens 134 which performs the function of minimizing the divergence of flux 56a–56c as it leaves the first focal plane 90. Other techniques to correct for the index of refraction change as a function of temperature can be utilized but these are thermomechanical corrections. The expansion and contraction of various mechanical members of the optical system 60 can be arranged to compensate for the shift of focal plane 90 and 102 caused by thermo-optical effects. For example, if desired, relay optical means 100 could be a single lens, such as germanium, which utilized bimetallic belleville washers (not shown) around the periphery of the lens and/or focal plane. In the alternative, thermo-couples could be used to sense the temperature of optical system 60 and then use this information to drive a motor that attempts to restore focus in an open-loop manner using previously calculated movements of lenses and/or focal planes. However, the more preferred approach is the completely passive approach which requires only judicious choice of optical materials.

A prescription of optical system 60 is described in Table 1 set forth below:

TABLE 1

| Optical Prescription | | | |
|---|---|---|---|
| SURFACE | RADIUS | THICKNESS | INDEX OF REFRACTION |
| 74 | 2.2500 | .1000 | 2.2120 |
| 76 | 2.1500 | 1.6800 | 1.0000 |
| 80 | −3.8100 | −1.5600 | −1.0000 |
| 86 | −1.3314 | 1.0871 | 1.0000 |
| 140 | −.2401 | .0630 | 2.6070 |
| 142 | −.2030 | .0213 | 1.0000 |

TABLE 1-continued

| | Optical Prescription | | |
|---|---|---|---|
| 144 | .3240 | .0500 | 2.2120 |
| 146 | .1798 | .2229 | 1.0000 |
| 148 | 1.3305 | .0850 | 2.6070 |
| 150 | −.6801 | .2754 | 1.0000 |
| 124 | 0.0000 | .0400 | 4.0040 |
| 126 | 0.0000 | .0600 | 1.0000 |
| 136 | 0.0000 | .0400 | 4.0040 |
| 132 | 0.0000 | .4100 | 1.0000 |
| 104 | 0.0000 | 0.0000 | 1.0000 |

| SURFACE | KAPPA | A4 | A6 | A8 | A10 |
|---|---|---|---|---|---|
| 80 | −.76482 | 0.0000 | 0.00000 | 0.00000 | 0.00000 |
| 86 | −4.05731 | 0.0000 | .92844 | −.02595 | −24.10100 |

Although the present invention has been shown and illustrated in terms of a specific apparatus it will be apparent that changes or modifications can be made without departing from the spirit and scope of the invention as defined by the appended claims.

What is claimed is:

1. A radiant energy receiver comprising:
   (a) a compact high cold shield efficiency optical means having a catadioptric objective optical system for forming a first focal plane for radiant energy emanating from a scene and a temperature tolerant relay optical means positioned after the first focal plane for refocusing throughout varying temperatures said first focal plane to a fixed second focal plane through an exit pupil;
   (b) a cold shield means having an aperture at the exit pupil, the aperture having substantially the same geometric configuration as the flux formed at the exit pupil to thereby reduce substantially any extraneous radiant energy reaching a detector means; and
   (c) a detector means positioned at the second focal plane, said detector means operative in response to the impinging radiant energy for producing electrical signals representative thereof.

2. A radiant energy receiver according to claim 1 wherein the temperature tolerant relay optical means includes a negative lens and a positive lens having substantially balanced thermal aberrations.

3. A radiant energy receiver according to claim 2 wherein the negative and positive lenses are selected from the group consisting of zinc sulfide, zinc selenide, gallium arsenide, silicon, cadmium tellurium and chalcogenide glasses.

4. A radiant energy system according to claim 2 wherein said positive and negative lenses have balanced color aberrations.

5. A radiant energy receiver according to claim 1 wherein the temperature tolerant relay optical means includes a lens made of germanium and further includes a temperature sensing means operatively connected to said lens for moving said lens in response to variations in temperature to maintain said second focal plane at a fixed position.

6. A radiant energy receiver according to claim 3 wherein one of said lenses is zinc sulphide and the other is a chalcogenide glass.

* * * * *